United States Patent
Yang et al.

(10) Patent No.: US 12,204,213 B2
(45) Date of Patent: Jan. 21, 2025

(54) PIXEL UNIT OF A DISPLAY PANEL, LOWER SUBSTRATE OF A DISPLAY PANEL, AND DISPLAY PANEL

(71) Applicant: TCL CHINA STAR OPTOELECTRONICS TECHNOLOGY CO., LTD., Guangdong (CN)

(72) Inventors: Liu Yang, Guangdong (CN); Yi Liu, Guangdong (CN); Chengcai Dong, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/613,450

(22) PCT Filed: Nov. 4, 2021

(86) PCT No.: PCT/CN2021/128601
§ 371 (c)(1),
(2) Date: Nov. 22, 2021

(87) PCT Pub. No.: WO2023/050528
PCT Pub. Date: Apr. 6, 2023

(65) Prior Publication Data
US 2024/0036409 A1    Feb. 1, 2024

(30) Foreign Application Priority Data
Sep. 30, 2021  (CN) .......................... 202111165120.3

(51) Int. Cl.
G02F 1/1362    (2006.01)
G02F 1/1343    (2006.01)

(52) U.S. Cl.
CPC .. G02F 1/136218 (2021.01); G02F 1/134309 (2013.01); G02F 1/136286 (2013.01)

(58) Field of Classification Search
CPC ......... G02F 1/136218; G02F 1/134309; G02F 1/136286
See application file for complete search history.

(56) References Cited

U.S. PATENT DOCUMENTS 5,446,562 A    8/1995  Sato
2004/0263710 A1    12/2004  Song et al.
(Continued)

FOREIGN PATENT DOCUMENTS

CN    1677206 A    10/2005
CN    101091135 A    12/2007
(Continued)

OTHER PUBLICATIONS

Chinese Office Action issued in corresponding Chinese Patent Application No. 202111165120.3 dated Sep. 14, 2022, pp. 1-5.
(Continued)

Primary Examiner — Mariam Qureshi
(74) Attorney, Agent, or Firm — PV IP PC; Wei Te Chung (57) ABSTRACT

The present application discloses a pixel unit of a display panel, a lower substrate of a display panel, and a display panel. The present application by disposing a transparent shielding electrode element connected to a common signal line and extending into the aperture region and making an orthogonal projection of the transparent shielding electrode element on a plane where the common signal line is located at least partially overlap the common signal line, extends a shielding effect provided by the common signal line such that a parasitic capacitor between the pixel electrode and the data line is lowered.

7 Claims, 7 Drawing Sheets

(56) References Cited

U.S. PATENT DOCUMENTS

| | | | |
|---|---|---|---|
| 2005/0259207 A1 | 11/2005 | Yang et al. | |
| 2013/0083263 A1 | 4/2013 | Kim et al. | |
| 2013/0088660 A1 | 4/2013 | Kaneko | |
| 2014/0198278 A1* | 7/2014 | Kesho | G02F 1/1368 349/46 |
| 2016/0252793 A1* | 9/2016 | Cheng | H01L 29/78633 257/72 |
| 2017/0076688 A1* | 3/2017 | Kim | G02F 1/13624 |
| 2019/0324580 A1* | 10/2019 | Tanaka | H10K 59/126 |

FOREIGN PATENT DOCUMENTS

| | | |
|---|---|---|
| CN | 101512628 A | 8/2009 |
| CN | 101989015 A | 3/2011 |
| CN | 103137555 A | 6/2013 |
| CN | 104269416 A | 1/2015 |
| CN | 104614910 A | 5/2015 |
| CN | 104701302 A | 6/2015 |
| CN | 105093750 A | 11/2015 |
| CN | 105278190 A | 1/2016 |
| CN | 109154758 A | 1/2019 |
| CN | 110335872 A | 10/2019 |
| CN | 111025801 A | 4/2020 |
| CN | 111221194 A | 6/2020 |
| CN | 111474780 A | 7/2020 |
| CN | 111580317 A | 8/2020 |
| CN | 113075825 A | 7/2021 |
| JP | 2002277889 A | 9/2002 |
| KR | 20160086020 A | 7/2016 |
| KR | 20210038670 A | 4/2021 |
| WO | 2013129200 A1 | 9/2013 |

OTHER PUBLICATIONS

Chinese Office Action issued in corresponding Chinese Patent Application No. 202111165120.3 dated Mar. 20, 2023, pp. 1-6.
Korean Office Action issued in corresponding Korean Patent Application No. 10-2022-7010221 dated Jun. 16, 2023, pp. 1-10.
Chinese Office Action issued in corresponding Chinese Patent Application No. 202111165120.3 dated Apr. 20, 2022, pp. 1-10.
International Search Report in International application No. PCT/CN2021/128601, mailed on Jun. 30, 2022.
Written Opinion of the International Searching Authority in International application No. PCT/CN2021/128601, mailed on Jun. 30, 2022.
Japanese Office Action issued in corresponding Japanese Patent Application No. 特願2021-567877 dated Feb. 5, 2024, pp. 1-4.

* cited by examiner

FIG. 1

Prior Art

PIXEL UNIT OF A DISPLAY PANEL, LOWER SUBSTRATE OF A DISPLAY PANEL, AND DISPLAY PANEL

FIELD OF INVENTION

The present application relates to a field of display technologies, especially to a pixel unit of a display panel, a lower substrate of a display panel, and a display panel.

BACKGROUND OF INVENTION

With development of liquid crystal display panel technologies, a transmittance of a pixel on display panel almost reaches the limit. Various pixel designs of conventional display panels all aim at simplification of wiring to increase a aperture region area to further raise an aperture rate and improve the transmittance.

Figure 1:
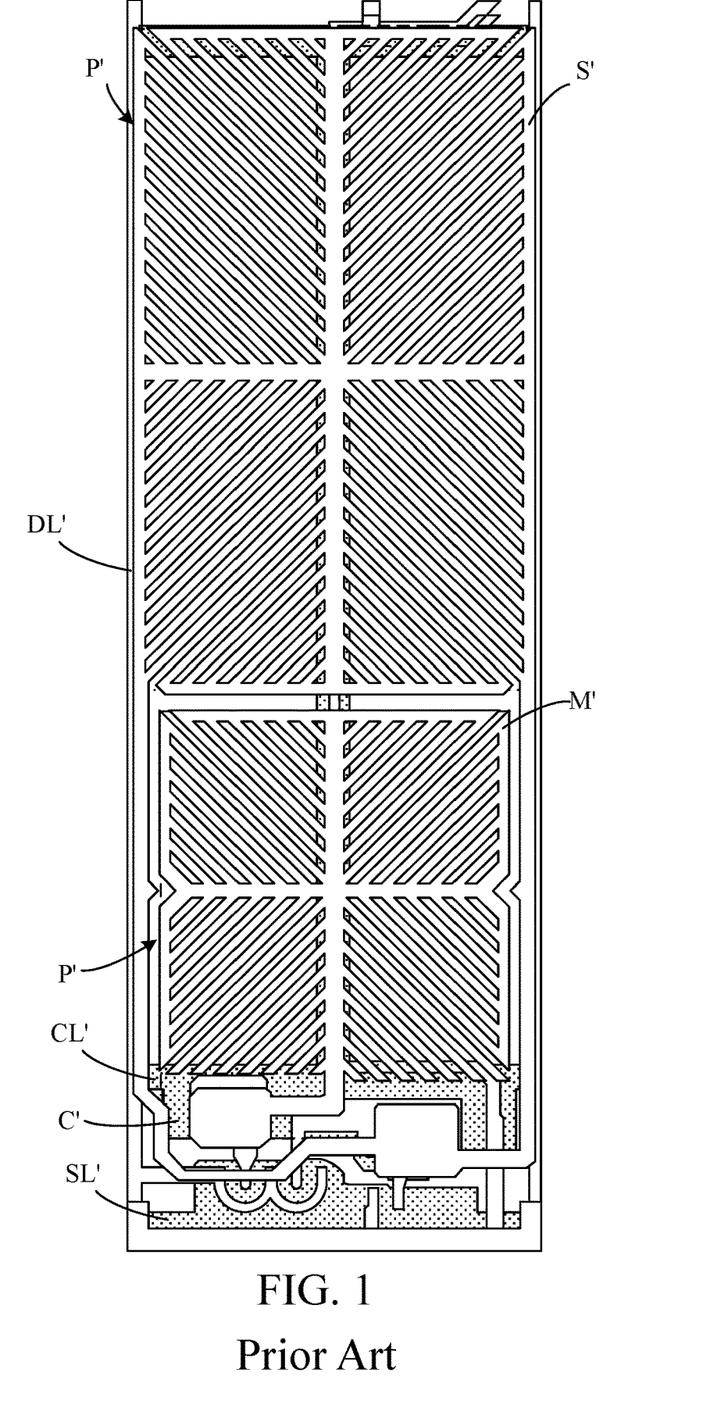
FIG. 1 is a schematic plan view of a pixel unit of a conventional display panel.

With reference to FIG. 1, FIG. 1 is a partial plan view of a pixel unit of a conventional liquid crystal display panel. The pixel unit comprises a data line DL' and a scan line SL' that perpendicularly intersect each other, and a pixel electrode element P' located at an intersection location of the data line DL' and the scan line SL'. The pixel electrode element P' comprises a main pixel electrode M' and a sub-pixel electrode S'. To increase an aperture rate of the display panel, the pixel unit skips black matrix (Data Black Matrix Less, DBL) on the data line DL', and skips a design of using a common electrode C' as a shielding metal, but uses a wiring of the sub-pixel electrode S' as a shielding element to lower a parasitic capacitor between the main pixel electrode M' and the data line DL'. However, such pixel unit design has an issue that the sub-pixel electrode S' in most of the time is floating without potential control such that it's shielding function is very limited and results in an excessively large parasitic capacitor between the main pixel electrode M' and the data line DL', which results in serious issues of color crosstalk and vertical crosstalk.

SUMMARY OF INVENTION

Technical Issue

The embodiment of the present application provides a pixel unit of a display panel, a lower substrate of a display panel, and a display panel to solve a technical issue of a excessive parasitic capacitor between a main pixel electrode of a pixel unit and a data signal line in a conventional display panel further causing serious color crosstalk and vertical crosstalk.

Technical Solution

In an aspect, an embodiment of the present application a pixel unit of a display panel, comprising:
  a scan signal line;
  a data signal line perpendicularly intersecting the scan signal line, wherein an aperture region is formed in an intersection location between the scan signal line and the data signal line;
  a common signal line disposed to be parallel to the scan signal line, wherein a common electrode is formed on the common signal line;
  a pixel electrode disposed in the aperture region; and
  a transparent shielding electrode element connected to the common signal line and extending from the common signal line into the aperture region, wherein an orthogonal projection of the transparent shielding electrode element on a plane where the common signal line is located at least partially overlap the common signal line.

In some embodiments of the present application, the transparent shielding electrode element is U-shaped, and comprises a first shielding section and two second shielding sections, the two second shielding sections extend from the common signal line into the aperture region, an end of each of the second shielding sections is connected to the common signal line, another end of each of the second shielding sections is connected to an end of the first shielding section, and an orthogonal projection of each of the second shielding sections on the plane where the common signal line is located at least partially overlaps the common signal line.

In some embodiments of the present application, the transparent shielding electrode element comprises two shielding bars, the two shielding bars are individual and spaced from each other, and extend from the common signal line into the aperture region, an end of each of the shielding bars is connected to the common signal line, and an orthogonal projection of each of the shielding bars on the plane where the common signal line is located at least partially overlaps the common signal line. Furthermore, the two shielding bars can be parallel.

In some embodiments of the present application, the transparent shielding electrode element and the common signal line are individually independent elements, and contact and are connected to each other.

In some embodiments of the present application, a material of the transparent shielding electrode element is indium tin oxide.

In another aspect, the embodiment of the present application provides a lower substrate of the display panel, comprising a glass substrate, and a first metal layer, a second metal layer, and a first transparent conductive layer sequentially stacked on the glass substrate, wherein the lower substrate further comprises:
  a scan signal line formed by patterning the first metal layer;
  a data signal line formed by patterning the second metal layer, perpendicularly intersecting the scan signal line, wherein an aperture region is formed in an intersection location between the scan signal line and the data signal line;
  a common signal line disposed on a same layer with the scan signal line and parallel to the scan signal line, wherein a common electrode is formed on the common signal line;
  a pixel electrode formed by patterning the first transparent conductive layer, and disposed in the aperture region; and
  a transparent shielding electrode element connected to the common signal line, extending from the common signal line into the aperture region, and an orthogonal projection of the transparent shielding electrode element on a plane where the common signal line is located at least partially overlaps the common signal line for providing a shielding effect and lower a parasitic capacitor between the pixel electrode and the data signal line.

In some embodiments of the present application, the transparent shielding electrode element comprises a first shielding section and two second shielding sections extending from the first shielding section and spaced from each other, each of the second shielding sections is connected to the common signal line by contact or integral formation, and an orthogonal projection of each of the second shielding sections on the plane where the common signal line is located overlaps the common signal line for providing a shielding effect and lowering a parasitic capacitor between the pixel electrode and the data signal line.

In some embodiments of the present application, the transparent shielding electrode element comprises two shielding bars being individual and spaced from each other, and each of the shielding bars is connected to the common signal line by contact or integral formation, and an orthogonal projection of each of the shielding bars on the plane where the common signal line is located overlaps the common signal line. Furthermore, the two shielding bars can be parallel.

In some embodiments of the present application, the lower substrate further comprises a second transparent conductive layer, wherein the second transparent conductive layer is disposed between the glass substrate and the first metal layer, and the transparent shielding electrode element is formed by patterning the second transparent conductive layer.

In some embodiments of the present application, the transparent shielding electrode element and the common signal line are individually independent elements, and contact and are connected to each other; and
  a material of the transparent shielding electrode element is indium tin oxide.

In some embodiments of the present application, the transparent shielding electrode element comprises a first shielding section and two second shielding sections extending from the first shielding section and spaced from each other, each of the second shielding sections is connected to the common signal line by contact or integral formation, and an orthogonal projection of each of the second shielding sections on the plane where the common signal line is located overlaps the common signal line.

In some embodiments of the present application, the transparent shielding electrode element comprises two shielding bars being individual and spaced from each other, and each of the shielding bars is connected to the common signal line by contact or integral formation, and an orthogonal projection of each of the shielding bars on the plane where the common signal line is located overlaps the common signal line.

In some embodiments of the present application, the lower substrate, further comprises a second transparent conductive layer, and the second transparent conductive layer is disposed between the glass substrate and the first metal layer, and the transparent shielding electrode element is formed by patterning the second transparent conductive layer.

In another aspect, the embodiment of the present application provides a display panel, comprising: a lower substrate, an upper substrate disposed opposite to the lower substrate, and a liquid crystal layer disposed between the upper substrate and the lower substrate, wherein the lower substrate comprises:
  a glass substrate, and a first metal layer, a second metal layer, and a first transparent conductive layer sequentially stacked on the glass substrate;
  a scan signal line formed by patterning the first metal layer;
  a data signal line formed by patterning the second metal layer, perpendicularly intersecting the scan signal line, wherein an aperture region is formed in an intersection location between the scan signal line and the data signal line;
  a common signal line disposed on a same layer with the scan signal line and parallel to the scan signal line, wherein a common electrode is formed on the common signal line;
  a pixel electrode formed by patterning the first transparent conductive layer, and disposed in the aperture region; and
  a transparent shielding electrode element connected to the common signal line, extending from the common signal line into the aperture region, and an orthogonal projection of the transparent shielding electrode element on a plane where the common signal line is located at least partially overlaps the common signal line.

In some embodiments of the present application, the transparent shielding electrode element comprises a first shielding section and two second shielding sections extending from the first shielding section and spaced from each other, each of the second shielding sections is connected to the common signal line by contact or integral formation, and an orthogonal projection of each of the second shielding sections on the plane where the common signal line is located overlaps the common signal line.

In some embodiments of the present application, the transparent shielding electrode element comprises two shielding bars being individual and spaced from each other, and each of the shielding bars is connected to the common signal line by contact or integral formation, and an orthogonal projection of each of the shielding bars on the plane where the common signal line is located overlaps the common signal line.

In some embodiments of the present application, the display panel further comprises a second transparent conductive layer, the second transparent conductive layer is disposed between the glass substrate and the first metal layer, and the transparent shielding electrode element is formed by patterning the second transparent conductive layer. In some embodiments of the present application, the transparent shielding electrode element comprises a first shielding section and two second shielding sections extending from the first shielding section and spaced from each other, each of the second shielding sections is connected to the common signal line by contact or integral formation, and an orthogonal projection of each of the second shielding sections on the plane where the common signal line is located overlaps the common signal line; the transparent shielding electrode element comprises two shielding bars being individual and spaced from each other, and each of the shielding bars is connected to the common signal line by contact or integral formation, and an orthogonal projection of each of the shielding bars on the plane where the common signal line is located overlaps the common signal line; and the display panel further comprises a second transparent conductive layer, the second transparent conductive layer is disposed between the glass substrate and the first metal layer, and the transparent shielding electrode element is formed by patterning the second transparent conductive layer.

In some embodiments of the present application, the transparent shielding electrode element and the common signal line are individually independent elements, and contact and are connected to each other.

In some embodiments of the present application, a material of the transparent shielding electrode element is indium tin oxide.

Advantages

The present application at least comprises advantages as follows:

The pixel unit of the display panel, the lower substrate of the display panel, and the display panel provided by the present application, by disposing a transparent shielding electrode element connected to a common signal line and extending into the aperture region and making an orthogonal projection of the transparent shielding electrode element on a plane where the common signal line is located at least partially overlap the common signal line, extends a shielding effect provided by the common signal line such that a parasitic capacitor between the pixel electrode and the data line is lowered to solve the technical issue of a excessive parasitic capacitor between a main pixel electrode portion of a pixel unit and a data signal line in a conventional display panel further causing serious color crosstalk and vertical crosstalk. Furthermore, because the transparent shielding electrode element and the pixel electrode of the present application are transparent conductive electrodes, therefore the transparent shielding electrode element extending into the aperture region would not reduce an aperture rate and a transmittance of the pixel unit to prevent reduction of the aperture rate and the transmittance of a shielding metal of the conventional pixel unit located in the aperture region.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In addition, it should be understood that the specific embodiments described here are only used to illustrate and explain the present application, and are not used to limit the present application. In the present application, the used orientation terminologies such as "upper" and "lower", when are not specified to the contrary explanation, usually refer to the upper and lower states of the device in actual use or working conditions, specifically according to the direction of the figures in the drawings. Furthermore, "inner" and "outer" refer to the outline of the device.

The embodiment of the present application provides a pixel unit of a display panel, a lower substrate of a display panel, and a display panel to solve a technical issue of a excessive parasitic capacitor between a main pixel electrode of a pixel unit and a data signal line in a conventional display panel further causing serious color crosstalk and vertical crosstalk.

Figure 2:
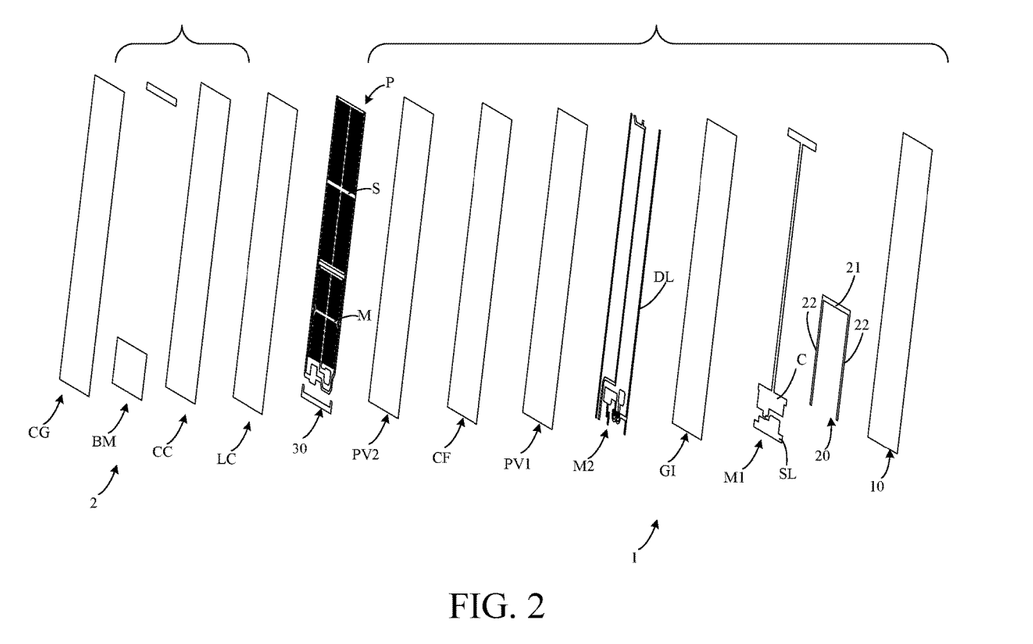
FIG. 2 is a schematic exploded perspective view of a display panel provided by an embodiment of the present application.
Figure 3A:
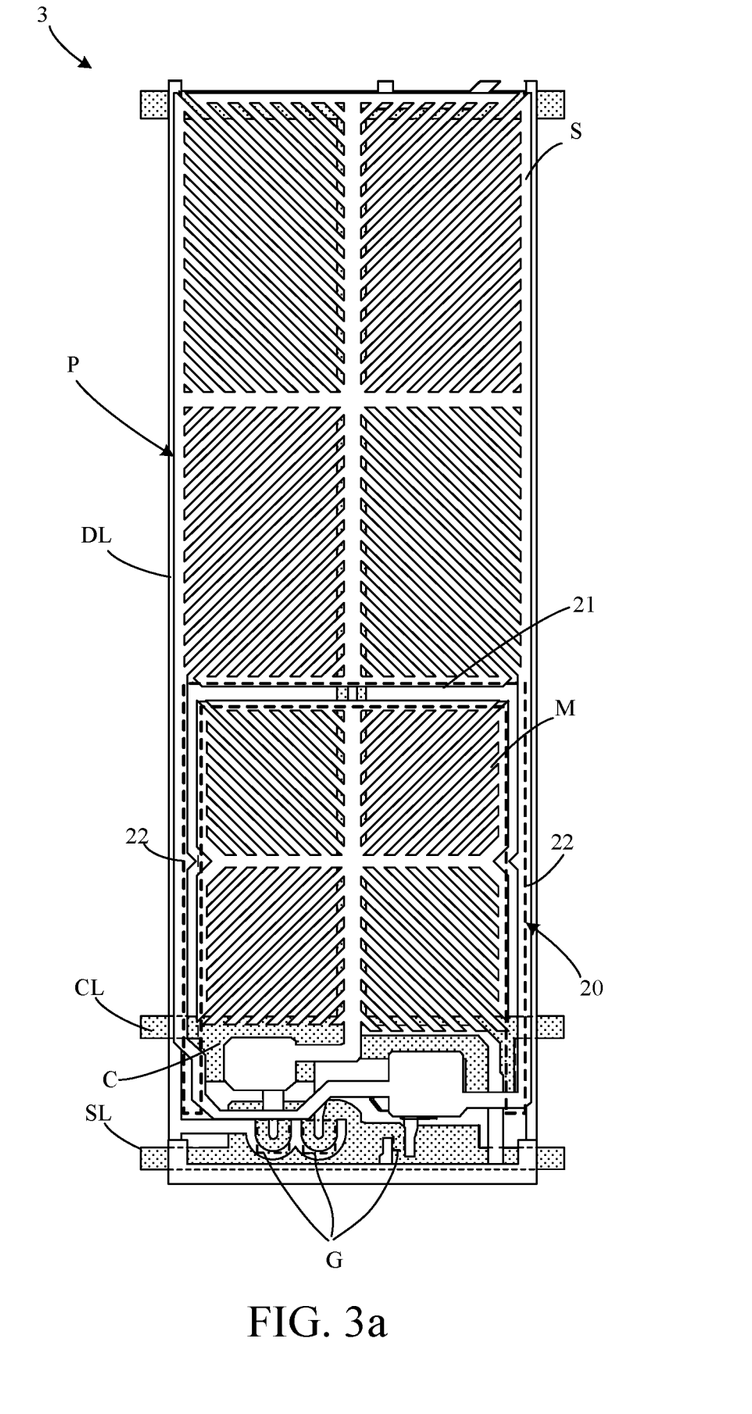
FIG. 3*a* is a schematic plan view of the pixel unit of the display panel provided by the embodiment of the present application.
Figure 3B:
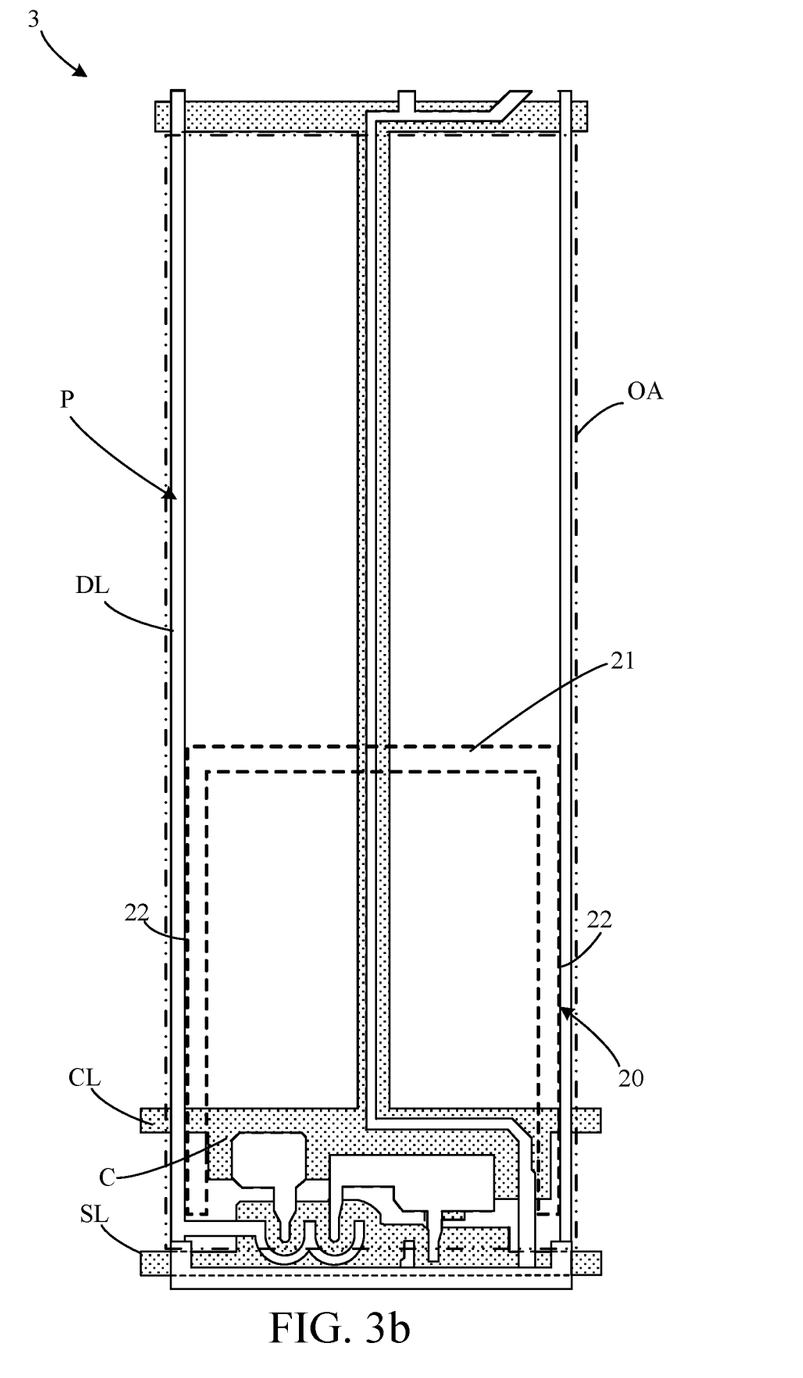
FIG. 3*b* is a schematic plan view of the pixel unit of the display panel provided by the embodiment of the present application, wherein pixel electrode is omitted and an aperture region is marked out.

With reference to FIGS. 2, 3*a* and 3*b*, the pixel unit 3 of the display panel provided by the embodiment of the present application comprises: a scan signal line SL, a data signal line DL, a common signal line CL, a pixel electrode P, and a transparent shielding electrode element 20.

A gate electrode G is formed on the scan signal line SL.

The data signal line DL perpendicularly intersects the scan signal line SL. An aperture region OA is formed in an intersection location between the scan signal line SL and the data signal line DL, as shown in FIG. 3*b*.

The common signal line CL is disposed to be parallel to the scan signal line SL, and a common electrode C is formed on the common signal line CL.

The pixel electrode P is disposed in the aperture region OA and can comprise a main pixel electrode portion M and a sub-pixel electrode portion S.

The transparent shielding electrode element 20 is connected to the common signal line CL and extends from the common signal line CL into the aperture region OA, and an orthogonal projection of the transparent shielding electrode element 20 on a plane where the common signal line CL is located at least partially overlaps the common signal line CL. In particular, a part of the common signal line CL covers a part of the transparent shielding electrode element 20, or a part of the transparent shielding electrode element 20 covers a part of the common signal line CL.

In particular, the transparent shielding electrode element 20 serves as an electrode for extending a shielding effect of the common signal line CL to further lower the parasitic capacitor between the main pixel electrode portion M and the data signal line DL to further prevent the issues of color crosstalk and vertical crosstalk. In a preferred embodiment of the present application, a material of the transparent shielding electrode element 20 can be indium tin oxide (ITO).

Figure 4:
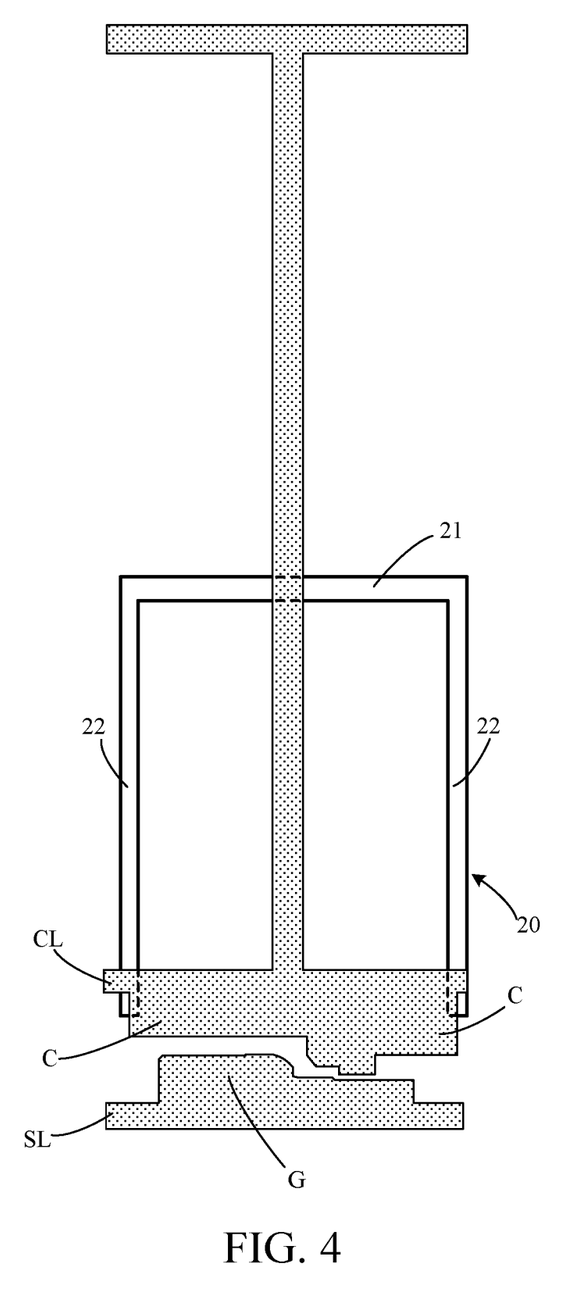
FIG. 4 is a schematic plan view of a common signal line in a first metal layer of the pixel unit of the display panel provided by the embodiment of the present application partially overlapping a transparent shielding electrode element.

With reference to FIGS. 3*a*, 3*b*, and 4, in an embodiment of the present application, the transparent shielding electrode element 20 is U-shaped, comprises 1 first shielding section 21 and two second shielding sections 22. The two second shielding sections 22 extend from the common electrode C into the aperture region OA. An end of each of the second shielding sections 22 is connected to the common signal line CL, and another end of each of the second shielding sections 22 is connected to an end of the first shielding section 21. An orthogonal projection of each of the second shielding sections 22 on the plane where the common signal line CL is located at least partially overlap the common signal line CL. Furthermore, the two second shielding sections 22 are located near the data signal line DL of the pixel unit and another data signal line DL of an adjacent pixel unit further included by the display panel and the two second shielding sections 22 can located on two sides of main pixel electrode portion M of the pixel electrode P to further lower the parasitic capacitor between the main pixel electrode portion M and the data signal line DL.

Figure 5:
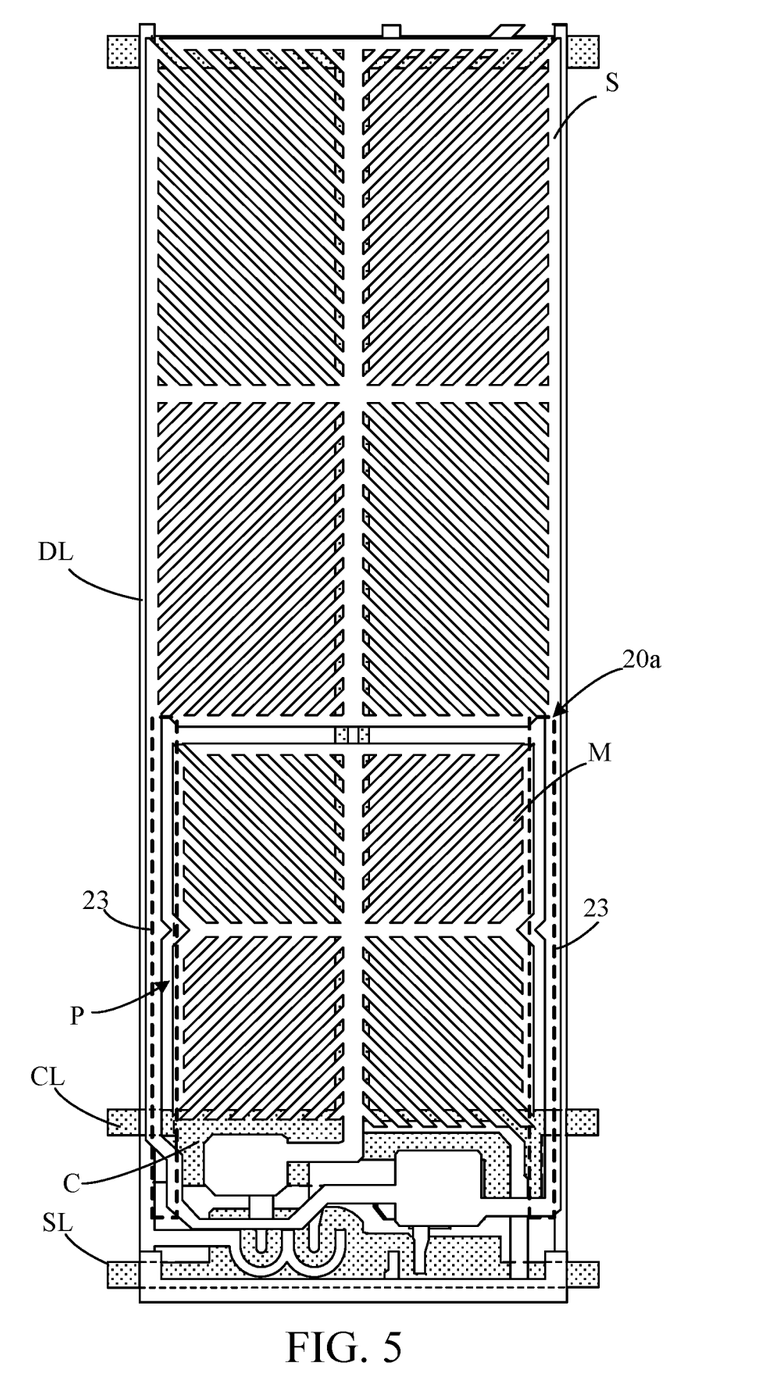
FIG. 5 is a schematic plan view of the pixel unit of the display panel provided by another embodiment of the present application.
Figure 6:
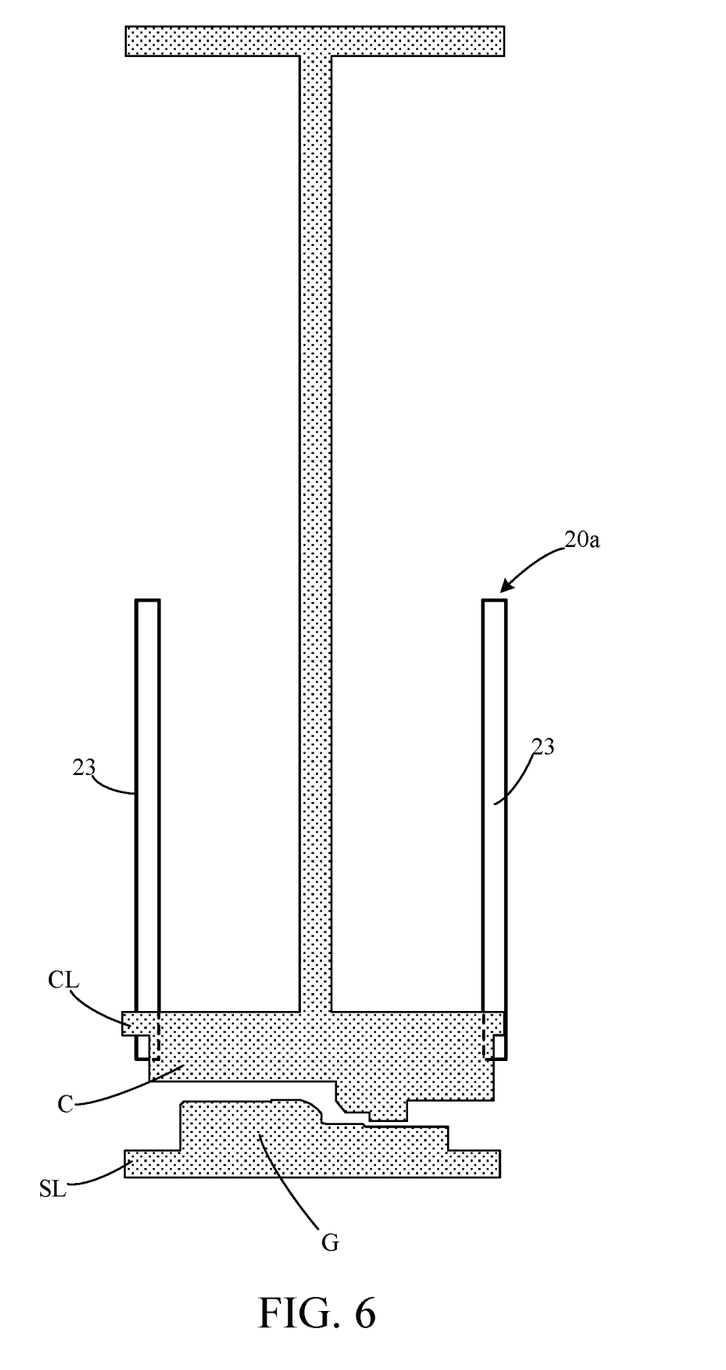
FIG. 6 is a schematic plan view of the common signal line of the first metal layer in the pixel unit of the display panel provided by another embodiment of the present application partially overlapping the transparent shielding electrode element.

With reference to FIGS. 5 and 6, in another embodiment of the present application, the transparent shielding electrode element 20a comprises two shielding bars 23. The two shielding bars 23 are individual and spaced from each other, extend from the common signal line CL into the aperture region OA, and an end of each of the shielding bars 23 is connected to the common signal line CL. An orthogonal projection of each of the shielding bars 23 on the plane where the common signal line CL is located at least partially overlap the common signal line CL. Furthermore, the two shielding bars 23 are located near the data signal line DL of the pixel unit and another data signal line DL of an adjacent pixel unit further included by the display panel, and the two shielding bars 23 can be located on two sides of main pixel electrode portion M of the pixel electrode P to further lower the parasitic capacitor between the main pixel electrode portion M and the data signal line DL.

In some embodiments of the present application, the transparent shielding electrode element 20 and the common signal line CL are located in different material layers, are elements being individual and separated from each other, and contact and are connected to each other. Alternatively, in some embodiments of the present application, both the transparent shielding electrode element 20 and the common signal line CL are disposed on a surface of the glass substrate 10, and a part of the common electrode C covers a part of the transparent shielding electrode element 20, or a part of the transparent shielding electrode element 20 covers a part of the common electrode C.

With reference to FIGS. 2, 3a, and 3b, the lower substrate of the display panel 1 provided by the embodiment of the present application, comprises a glass substrate 10, and a first metal layer M1, a second metal layer M2, and a first transparent conductive layer 30 sequentially stacked on the glass substrate 10, wherein the lower substrate 1 further comprises: a scan signal line SL, a data signal line DL, a common signal line CL, pixel electrode P, and a transparent shielding electrode element 20.

The scan signal line SL is formed by patterning the first metal layer M1, and a gate electrode G is formed on the scan signal line SL.

The data signal line DL is formed by patterning the second metal layer M2, perpendicularly intersects the scan signal line SL, an aperture region OA is formed in an intersection location between the scan signal line SL and the data signal line DL.

The common signal line CL is disposed in a same layer with the scan signal line SL and is parallel to the scan signal line SL. A common electrode C is formed on the common signal line CL.

The pixel electrode P is formed by patterning the first transparent conductive layer 30, is disposed in the aperture region OA, and can comprise a main pixel electrode portion M and a sub-pixel electrode portion S.

The transparent shielding electrode element 20 is connected to the common signal line CL, extends from the common signal line CL into the aperture region, and an orthogonal projection of the transparent shielding electrode element 20 on the plane where the common signal line CL is located at least partially overlap the common signal line CL.

In particular, the transparent shielding electrode element 20 serves as a shielding electrode to shield the common signal line CL to further lower a parasitic capacitor between the main pixel electrode portion M and the data signal line DL, and further prevent the issues of color crosstalk and vertical crosstalk. In a preferred embodiment of the present application, a material of the transparent shielding electrode element 20 can be indium tin oxide (ITO).

With reference to FIGS. 3a, 3b, and 4, in an embodiment of the present application, the transparent shielding electrode element 20 is U-shaped and comprises a first shielding section 21 and two second shielding sections 22. The two second shielding sections 22 extend from the common signal line CL into the aperture region. An end of each of the second shielding sections 22 is connected to the common signal line CL, and another end of each of the second shielding sections 22 is connected to an end of the first shielding section 21. An orthogonal projection of each of the second shielding sections 22 on the plane where the common signal line CL is located at least partially overlap the common signal line CL. Furthermore, the two second shielding sections 22 are located near the data signal line DL of the pixel unit and another data signal line DL of an adjacent the pixel unit further included by the display panel, and the two second shielding sections 22 can be located on two sides of the main pixel electrode portion M of the pixel electrode P respectively to further lower a parasitic capacitor between the main pixel electrode portion M and the data signal line DL.

In particular, the lower substrate of the display panel 1 provided by the embodiment of the present application further comprises an insulation layer GI, semiconductor layer (not shown), a first passivation layer PV1, a color photoresist layer CF, and a second passivation layer PV2. The glass substrate 10, the first metal layer M1, the insulation layer GI, the semiconductor layer, the second metal layer M2, the first passivation layer PV1, the color photoresist layer CF, the second passivation layer PV2, and the first transparent conductive layer 30 are sequentially stacked on one another to form the lower substrate 1.

With reference to FIGS. 5 and 6, in another embodiment of the present application, the transparent shielding electrode element 20 comprises two shielding bars 23. The two shielding bars 23 are individual and spaced from each other, and extend from the common signal line CL into the aperture region. An end of each of the shielding bars 23 is connected to the common signal line CL, and an orthogonal projection of each of the shielding bars 23 on the plane where the common signal line CL is located at least partially overlap the common signal line CL. Furthermore, the two shielding bars 23 are located near the data signal line DL of the pixel unit and another data signal line DL of an adjacent pixel unit further included by the display panel, and the two shielding bars 23 can be located two sides of the main pixel electrode portion M of the pixel electrode P respectively to further lower the parasitic capacitor between the main pixel electrode portion M and the data signal line DL.

In some embodiments of the present application, the transparent shielding electrode element 20 is formed by patterning the second transparent conductive layer. In particular, the second transparent conductive layer is disposed between the glass substrate 10 and the first metal layer M1.

The transparent shielding electrode element 20 is formed by patterning the second transparent conductive layer with a lithography process.

In another aspect, the display panel provided by the embodiment of the present application comprises: the lower substrate 1 of the above embodiment, an upper substrate 2 disposed opposite to the lower substrate 1, and a liquid crystal layer LC disposed between the upper substrate 2 and the lower substrate 1. In particular, upper substrate 2 further comprises a black matrix BM to define the aperture region OA. Furthermore, the upper substrate 2 further comprises an upper substrate common electrode CC and a top cover CG, as shown in FIG. 2.

The following comparison table is for comparison between a parasitic capacitor of the above pixel unit before increasing the transparent shielding electrode element 20 and after increasing the transparent shielding electrode element 20. It can be understood from the comparison table that after the U-shaped transparent electrode is increased, the parasitic capacitor of the main pixel electrode portion M can be decreased to 12% of an original value, and the parasitic capacitor/total capacitor is reduced from 1.24% to 0.15%, which indicates that the transparent shielding electrode element 20 has a parasitic capacitor reduction effect. When an area of the transparent shielding electrode element 20 is sufficiently increased, the parasitic capacitor/total capacitor would be smaller.

| Main pixel electrode portion M | Before increase of the transparent shielding electrode element 20 | After increase of the U-shaped transparent shielding electrode element 20 | After increase of 11-shaped transparent shielding electrode element 20 |
| --- | --- | --- | --- |
| Parasitic capacitor [fF] | 4.070 | 0.486 | 0.561 |
| Total capacitor [fF] | 327.560 | 333.259 | 331.566 |
| Parasitic capacitor/Total capacitor | 1.24% | 0.15% | 0.17% |

The present application at least comprises advantages as follows:

The pixel unit of the display panel, the lower substrate 1 of the display panel, and the display panel provided by the present application, by disposing a transparent shielding electrode element 20 connected to a common electrode C and extending into the aperture region and making an orthogonal projection of the transparent shielding electrode element 20 on a plane where the common signal line CL is located at least partially overlap the common signal line CL, extends a shielding effect provided by the common signal line CL such that a parasitic capacitor between the pixel electrode and the data line is lowered to solve the technical issue of a excessive parasitic capacitor between a main pixel electrode portion M of a pixel unit and a data signal line in a conventional display panel further causing serious color crosstalk and vertical crosstalk. Furthermore, because the transparent shielding electrode element 20 and the pixel electrode P of the present application are transparent conductive electrodes, therefore the transparent shielding electrode element 20 extending into the aperture region would not reduce an aperture rate and a transmittance of the pixel unit to prevent reduction of the aperture rate and the transmittance of a shielding metal of the conventional pixel unit located in the aperture region.

In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A pixel unit of a display panel, comprising:
    a scan signal line;
    a data signal line perpendicularly intersecting the scan signal line, wherein an aperture region is formed in an intersection location between the scan signal line and the data signal line;
    a common signal line disposed to be parallel to the scan signal line, wherein a common electrode is formed on the common signal line;
    a pixel electrode disposed in the aperture region; and
    a transparent shielding electrode element connected to the common signal line and extending from the common signal line into the aperture region, wherein an orthogonal projection of the transparent shielding electrode element on a plane where the common signal line is located at least partially overlap the common signal line;
    wherein the transparent shielding electrode element is an individual element from the common signal line, and is connected to the common signal line by at least partially overlapping and contacting the common signal line;
    wherein the transparent shielding electrode element is made of indium tin oxide, and the common signal line is made of an opaque metal free of indium tin oxide;
    wherein the transparent shielding electrode element is U-shaped, and comprises a first shielding section and two second shielding sections extending from the first shielding section and spaced from each other, an end of each of the second shielding sections is connected to the common signal line by contacting the common signal line, another end of each of the second shielding sections is connected to and formed integrally at an end of the first shielding section, an orthogonal projection of each of the second shielding sections on the plane where the common signal line is located at least partially overlaps the common signal line, and overlap portions between the second shielding sections of the transparent shielding electrode element and the common line are spaced from each other.

2. A lower substrate of a display panel, comprising a glass substrate, and a first metal layer, a second metal layer, and a first transparent conductive layer sequentially stacked on the glass substrate, wherein the lower substrate further comprises:
    a scan signal line formed by patterning the first metal layer;

a data signal line formed by patterning the second metal layer, perpendicularly intersecting the scan signal line, wherein an aperture region is formed in an intersection location between the scan signal line and the data signal line;

a common signal line disposed on a same layer with the scan signal line and parallel to the scan signal line, wherein a common electrode is formed on the common signal line;

a pixel electrode formed by patterning the first transparent conductive layer, and disposed in the aperture region; and a transparent shielding electrode element connected to the common signal line, extending from the common signal line into the aperture region, and an orthogonal projection of the transparent shielding electrode element on a plane where the common signal line is located at least partially overlaps the common signal line for providing a shielding effect and lower a parasitic capacitor between the pixel electrode and the data signal line;

wherein the transparent shielding electrode element is an individual element from the common signal line, and is connected to the common signal line by at least partially overlapping and contacting the common signal line;

wherein the transparent shielding electrode element is made of indium tin oxide, and the common signal line is made of an opaque metal free of indium tin oxide;

wherein the transparent shielding electrode element is U-shaped, and comprises a first shielding section and two second shielding sections extending from the first shielding section and spaced from each other, an end of each of the second shielding sections is connected to the common signal line by contacting the common signal line, another end of each of the second shielding sections is connected to and formed integrally at an end of the first shielding section, an orthogonal projection of each of the second shielding sections on the plane where the common signal line is located at least partially overlaps the common signal line, and overlap portions between the second shielding sections of the transparent shielding electrode element and the common line are spaced from each other.

3. The lower substrate of the display panel according to claim 2, further comprising a second transparent conductive layer, wherein the second transparent conductive layer is disposed between the glass substrate and the first metal layer, and the transparent shielding electrode element is formed by patterning the second transparent conductive layer.

4. The lower substrate of the display panel according to claim 2, further comprising a second transparent conductive layer, the second transparent conductive layer is disposed between the glass substrate and the first metal layer, and the transparent shielding electrode element is formed by patterning the second transparent conductive layer.

5. A display panel, comprising: a lower substrate, an upper substrate disposed opposite to the lower substrate, and a liquid crystal layer disposed between the upper substrate and the lower substrate, wherein the lower substrate comprises:

a glass substrate, and a first metal layer, a second metal layer, and a first transparent conductive layer sequentially stacked on the glass substrate;

a scan signal line formed by patterning the first metal layer;

a data signal line formed by patterning the second metal layer, perpendicularly intersecting the scan signal line, wherein an aperture region is formed in an intersection location between the scan signal line and the data signal line;

a common signal line disposed on a same layer with the scan signal line and parallel to the scan signal line, wherein a common electrode is formed on the common signal line;

a pixel electrode formed by patterning the first transparent conductive layer, and disposed in the aperture region; and a transparent shielding electrode element connected to the common signal line, extending from the common signal line into the aperture region, and an orthogonal projection of the transparent shielding electrode element on a plane where the common signal line is located at least partially overlaps the common signal line;

wherein the transparent shielding electrode element is an individual element from the common signal line, and is connected to the common signal line by at least partially overlapping and contacting the common signal line;

wherein the transparent shielding electrode element is made of indium tin oxide, and the common signal line is made of an opaque metal free of indium tin oxide;

wherein the transparent shielding electrode element is U-shaped, and comprises a first shielding section and two second shielding sections extending from the first shielding section and spaced from each other, an end of each of the second shielding sections is connected to the common signal line by contacting the common signal line, another end of each of the second shielding sections is connected to and formed integrally at an end of the first shielding section, an orthogonal projection of each of the second shielding sections on the plane where the common signal line is located at least partially overlaps the common signal line, and overlap portions between the second shielding sections of the transparent shielding electrode element and the common line are spaced from each other.

6. The display panel according to claim 5, further comprising a second transparent conductive layer, the second transparent conductive layer is disposed between the glass substrate and the first metal layer, and the transparent shielding electrode element is formed by patterning the second transparent conductive layer.

7. The display panel according to claim 5, wherein
the display panel further comprises a second transparent conductive layer, the second transparent conductive layer is disposed between the glass substrate and the first metal layer, and the transparent shielding electrode element is formed by patterning the second transparent conductive layer.

* * * * *